United States Patent
Rittenhouse

(10) Patent No.: US 7,455,131 B2
(45) Date of Patent: Nov. 25, 2008

(54) SUSPENSION SYSTEM FOR TRACKED VEHICLES

(76) Inventor: Norman Rittenhouse, 1001 N. First St., Fairbury, IL (US) 61739

( * ) Notice: Subject to any disclaimer, the term of this patent is extended or adjusted under 35 U.S.C. 154(b) by 254 days.

(21) Appl. No.: 11/471,345

(22) Filed: Jun. 20, 2006

(65) Prior Publication Data

US 2007/0203626 A1    Aug. 30, 2007

Related U.S. Application Data

(60) Provisional application No. 60/776,778, filed on Feb. 24, 2006.

(51) Int. Cl.
*B62D 55/00* (2006.01)
*B62D 55/104* (2006.01)

(52) U.S. Cl. .................. 180/9.5; 180/193; 180/24.2; 280/124.1

(58) Field of Classification Search ............. 180/9.5, 180/193, 24.2; 280/124.1
See application file for complete search history.

(56) References Cited

U.S. PATENT DOCUMENTS

| | | | | | |
|---|---|---|---|---|---|
| 2,374,240 | A | * | 4/1945 | Shankman | ........... 180/9.62 |
| 3,374,005 | A | * | 3/1968 | Donlon et al. | ........ 280/124.129 |
| 3,409,309 | A | * | 11/1968 | Larsen | ............... 280/124.129 |
| 4,513,833 | A | * | 4/1985 | Sheldon | .................. 180/9.1 |
| 5,533,587 | A | | 7/1996 | Dow et al. | ................ 180/235 |
| 6,044,921 | A | | 4/2000 | Lansberry | ................ 180/9.36 |
| 6,220,377 | B1 | | 4/2001 | Lansberry | ................ 180/9.36 |
| 7,273,117 | B2 | * | 9/2007 | Pond | .................... 180/24.02 |
| 2004/0195023 | A1 | * | 10/2004 | Yoshihara | ................. 180/193 |
| 2007/0227796 | A1 | * | 10/2007 | Simmons et al. | ........... 180/193 |

* cited by examiner

*Primary Examiner*—Paul N Dickson
*Assistant Examiner*—Marlon A Arce Diaz
(74) *Attorney, Agent, or Firm*—Brian S. Steinberger; Phyllis K. Wood; Law Offices of Brian S. Steinberger, P.A.

(57) ABSTRACT

A suspension system for a tracked vehicle that includes at least four suspension cylinders for suspending at least two track module frames to a chassis of the tracked vehicle to allow torsional flexing to accommodate terrain unevenness with significantly less terrain damage to provide a smoother, safer ride, with bump absorption and improved stability. The suspension cylinders can be hydraulic cylinders, pneumatic cylinders for air bags, powered jackscrews or manual jackscrews. The suspension system also includes lateral links for attaching the at least two track frame module to the chassis to allow the track module frame to move vertically, to tilt and to angle for resiliently tracking uneven surfaces. Longitudinal links for attaching each of the at least two track frame module to the chassis to keep the at least two track module frames centered within the chassis of the tracked vehicle.

24 Claims, 6 Drawing Sheets

SUSPENSION SYSTEM FOR TRACKED VEHICLES

This invention claims the benefit of priority to U.S. Provisional Patent Application Ser. No. 60/776,778 filed Feb. 24, 2006.

FIELD OF INVENTION

This invention relates to tracked vehicles, in particular to environmentally friendly tracked vehicles having compliant and independent suspension systems, and related devices, apparatus and methods of operation thereof.

BACKGROUND AND PRIOR ART

The continuing search for uncovering newly found deposits of natural energy reserves that include oil exploration has been difficult in sensitive environments such as the North Slope of Alaska. creates a need for this invention, since current land based vehicles can damage and destroy those environments. For example, land based vehicles having separate individual wheels can cause deformation to the ground and gouging of the ground surface while being operated. Thus, it is highly desirable under certain environmentally sensitive conditions to have a tracked vehicle which would cause the least deformation to the ground as possible. Such uses include operation across frozen tundra typical of the ANWR region of the North Slope of Alaska.

While wheeled vehicles typically have highly refined independent suspension systems, tracked vehicles have been generally limited to rigid, non-compliant suspension systems. This has been a necessity partly due to the driving track wheels being rigidly mounted to the power train. Because of this rigid mounting, the vehicle causes the ground to conform to the track system, rather than the other way around.

Most tracked vehicles are powered by mechanically driven track wheels which are prone to problems. Tracked wheels are not known to have independent suspensions. Although better than separate wheeled vehicles, traditional tracked wheels such as those found on tractors, military vehicles and the like, have been also known to damage and gouge a ground surface.

Various types of track type vehicles have been proposed over the years. See for example, U.S. Pat. No. 5,533,587 to Dow et al.; and U.S. Pat. Nos. 6,044,921 and 6,220,377 both to Lansberry. However, none of these cited references overcomes all the problems described above.

Thus, the need exists for solutions to the above problems with the prior art.

SUMMARY OF THE INVENTION

A primary objective of the present invention is to provide tracked vehicle, and related apparatus, devices and methods of operating the tracked vehicle which causes the least deformation of the ground as possible, and is most useful in environmentally sensitive areas such as the frozen tundra typical of the ANWR region of the North Slope of Alaska. By using a completely compliant, independent suspension of a tracked vehicle, it is possible to operate under sensitive conditions with a very low footprint signature, which minimizes any deformation to the environment.

A secondary objective of the present invention is to provide tracked vehicle, and related apparatus, devices and methods of operating the tracked vehicle where the driving track wheels are not mechanically connected to the power train, or to the main physical frame of the vehicle.

A third objective of the present invention is to provide tracked vehicle, and related apparatus, devices and methods of operating the tracked vehicle which uses electrically driven, direct drive PM brushless DC motor contained within the actual driving track cogged wheel.

A fourth objective of the present invention is to provide tracked vehicle, and related apparatus, devices and methods of operating the tracked vehicle having an improved independent suspension system for use on environmentally sensitive terrains.

A fifth objective of the present invention is to provide tracked vehicle, and related apparatus, devices and methods of operating the tracked vehicle where the vehicle is fully articulated for less damage to frozen tundra, sensitive soil conditions.

A sixth objective of the present invention is to provide tracked vehicle, and related apparatus, devices and methods of operating the tracked vehicle, where the drive motor is located inside the track wheel, and the track is directly driven by cogged track wheel, without need for a speed reduction gearbox.

A seventh objective of the present invention is to provide tracked vehicle, and related apparatus, devices and methods of operating the tracked vehicle, having four track wheels each electrically powered, so that the individual wheels distributes stress in track for less environmental disturbance.

An eighth objective of the present invention is to provide tracked vehicle, and related apparatus, devices and methods of operating the tracked vehicle, where left and right track assemblies are interchangeable for lower manufacture cost and easier field maintenance.

A ninth objective of the present invention is to provide tracked vehicle, and related apparatus, devices and methods of operating the tracked vehicle, where track assemblies are fully articulated with independent leveling, tilting, castor, camber, and toe-in.

A tenth objective of the present invention is to provide tracked vehicle, and related apparatus, devices and methods of operating the tracked vehicle, where track assemblies can be skewed for operation on a slope.

An eleventh objective of the present invention is to provide tracked vehicle, and related apparatus, devices and methods of operating the tracked vehicle, having independent motors and electronic drives per track allow get-home capability in event of failure of a single drive motor or electronic drive or related components.

A twelfth objective of the present invention is to provide tracked vehicle, and related apparatus, devices and methods of operating the tracked vehicle where the vehicle can be prepared for over the road shipment with track assemblies removed for width and weight restrictions.

A thirteenth objective of the present invention is to provide tracked vehicle, and related apparatus, devices and methods of operating the tracked vehicle, having a track frame that allows torsional flexing to accommodate terrain unevenness with significantly less terrain damage.

A fourteenth objective of the present invention is to provide tracked vehicle, and related apparatus, devices and methods of operating the tracked vehicle, having electric drive track assemblies that permit increased and adjustable ground clearance.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 1:
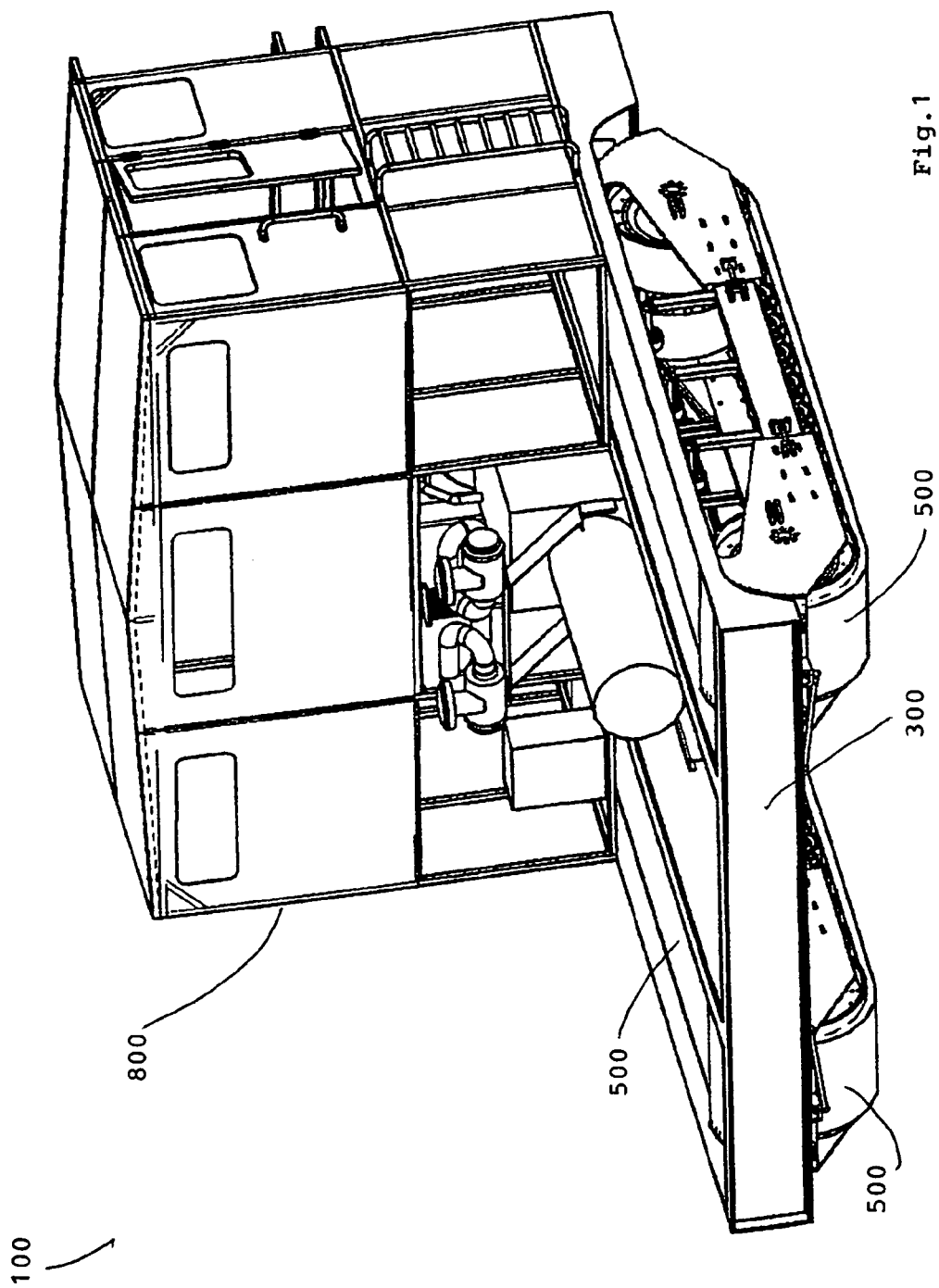
FIG. 1 is a perspective view of a tracked vehicle with the novel suspension system using independently driven wheels.
Figure 2:
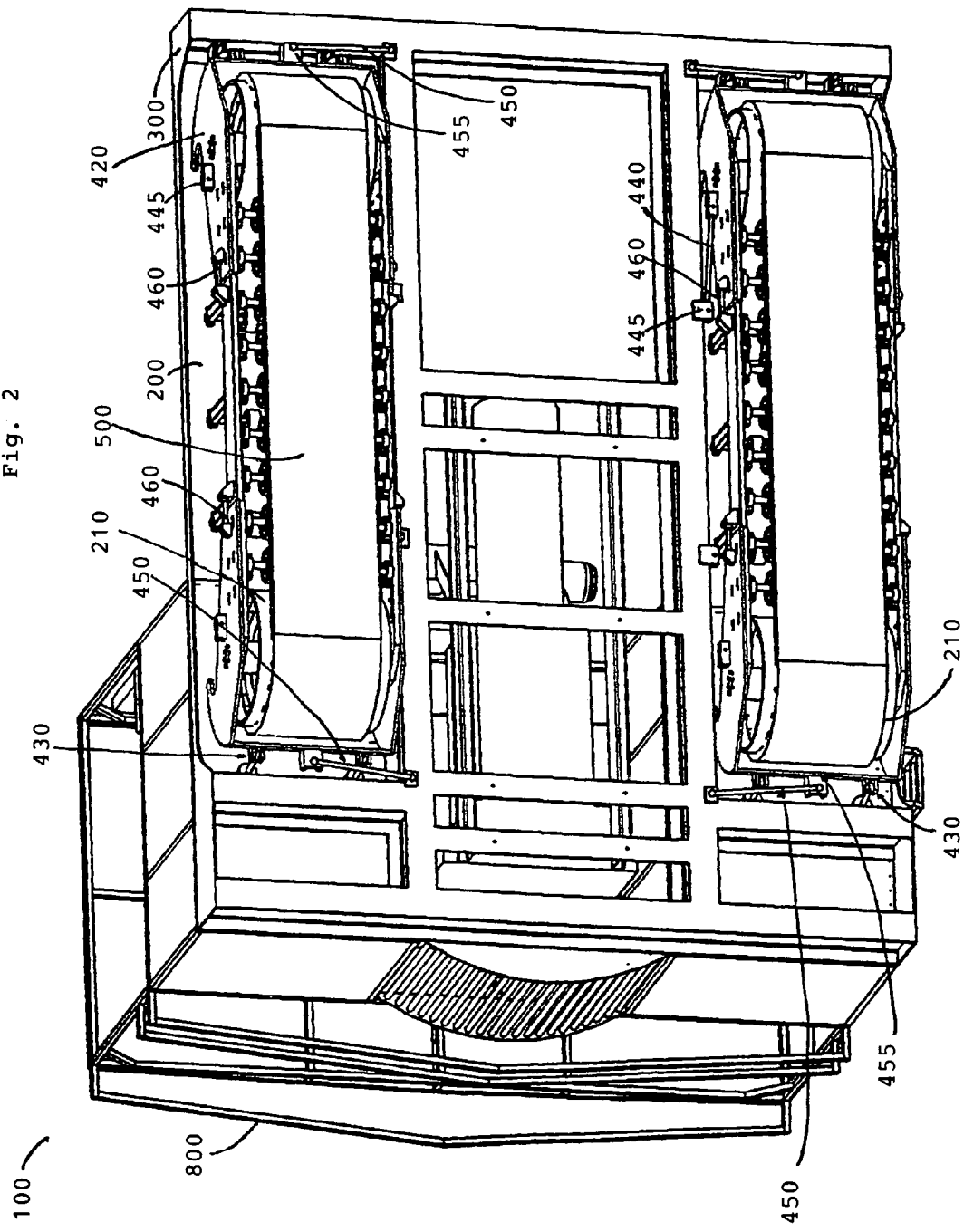
FIG. 2 is a bottom view of the tracked vehicle of FIG. 1.
Figure 3:
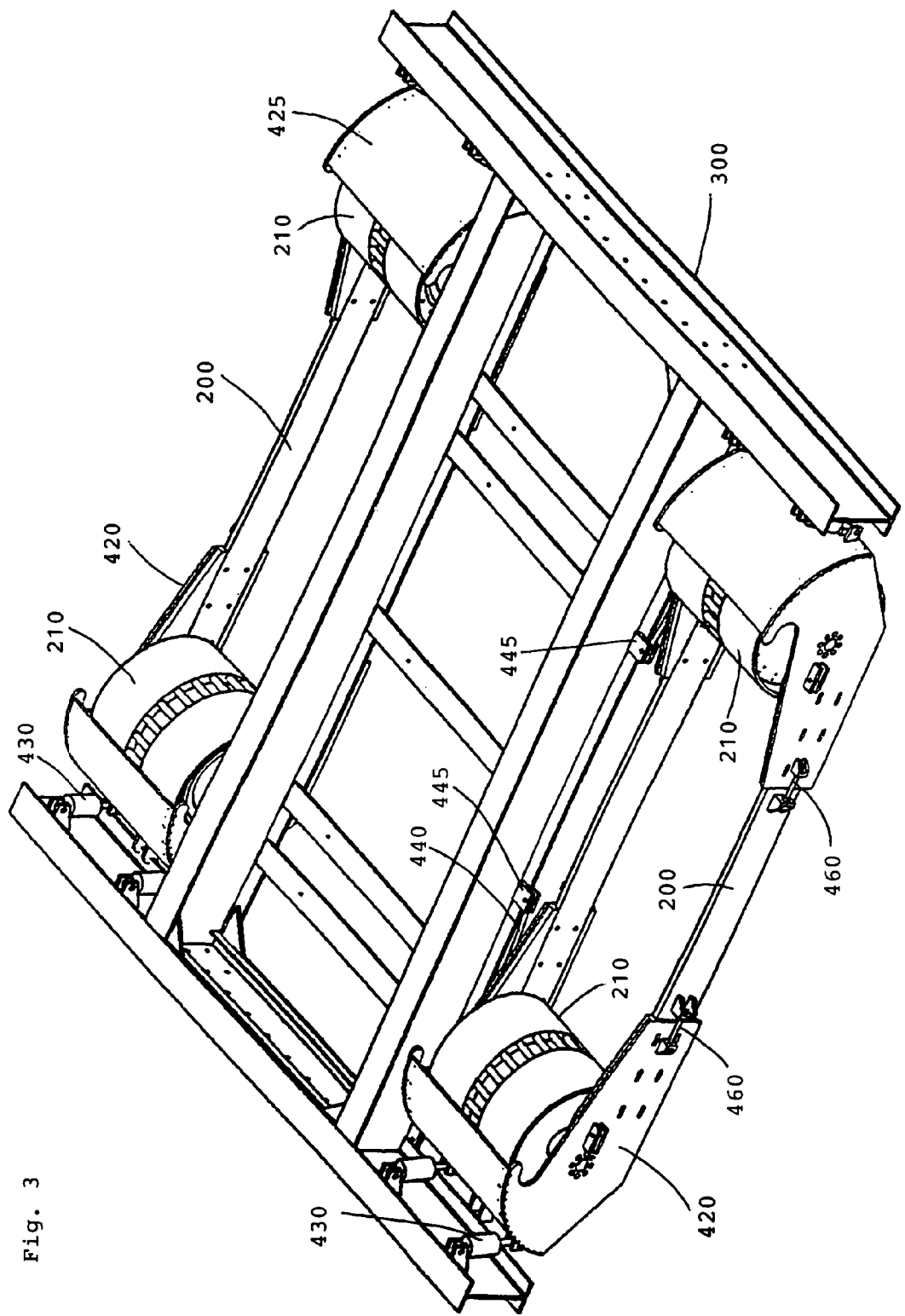
FIG. 3 is a perspective view showing the track module frame suspended from the tracked vehicle chassis with the suspension system of the present invention.

100 tracked vehicle
200 track module frame
205 parallel track module frame side
210 electrically driven wheels
212 driving track wheel
214 brushless DC motor
216 motor mounting shaft
220 built in cogs
300 vehicle chassis frame
416 mounting plate
420 curved suspension plate
425 cover
430 suspension cylinders
440 lateral links
445 rod end fittings
450 longitudinal links
460 sliding members
500 track
520 track cogs
800 cabin FIG. 1 is a perspective view of a tracked vehicle using the electrically driven wheels and FIG. 2 is a bottom view of the tracked vehicle shown in FIG. 1. FIG. 3 is a perspective view of the electrically driven wheels connected with the suspension system and frame of the tracked vehicle shown in FIG. 1. As shown in FIG. 2, the suspension system is connected with the vehicle chassis frame 300 and the track module frame 200. The independently driven track wheels 210 are connected to the curved endplates 420 of the track module frame 200.

As shown in FIG. 2, suspension cylinders 430 connect the front and rear ends of the track module frame to the vehicle chassis 300. In the example shown, the left and right track module frames 200 are each connected to the chassis 300 with two front and two rear suspension cylinders 300 to absorb shock. The suspension cylinders 430 can be hydraulic, pneumatic, and spring or other shock absorber capable of absorbing shock. The shock absorbers 430 between the track module frame 200 and the vehicle chassis 300 also dampen oscillations. The suspension cylinders connect hard mounting points 435 on the cover 420 between the right and left curved suspension plates 420 to corresponding hard mounting points 435 of the tracked vehicle chassis 300. Typical hydraulic cylinders are shown in FIGS. 2 and 3, however, pneumatic cylinders, or air bags, are easily substituted according to requirements of climate, etc.

Additionally, longitudinal links 450 and lateral links 440 attach the track module frame 200 to the vehicle chassis 300. The longitudinal and lateral links 450 and 440, respectively, attach at both ends with rod end fittings 445 giving a wide range of angular freedom of movement. The purpose of the longitudinal and lateral links 450 and 440 is to allow the track module frame to move vertically, to tilt and to angle while keeping the track module frame 200 located and centered within the vehicle chassis 300. The longitudinal link 450 transmits forward or reverse movement from the powered track module frame 200 to the tracked vehicle chassis 300.

As shown in FIG. 3, the track module frame 200 includes parallel frame sides to balance loads within the track module 200 so that the driving torque of the independently driven track wheels 210 is reacted to the track module frame 200. Each end of the parallel sides of the track module frame 200 includes a curved suspension plate 420 for suspending the track module frame 200 from the chassis 300 of the tracked vehicle and for connecting the independently driven track wheels 210. Track module frame covers 425 are connected between the right and left parallel side frames 205.

As shown, the parallel frame sides include sliding members for expanding and contracting the length of each of the left and right track parallel sides 205 for adjusting a position of each one of the independently driven track wheels 210 closer or further away from another independently driven track wheel 210. The curved suspension plate 420 has a rod end fitting 445 for connecting a longitudinal link 450 between the inner curved suspension plate 420 of the track module frame 200 to the adjacent chassis frame 300.

Figure 4:
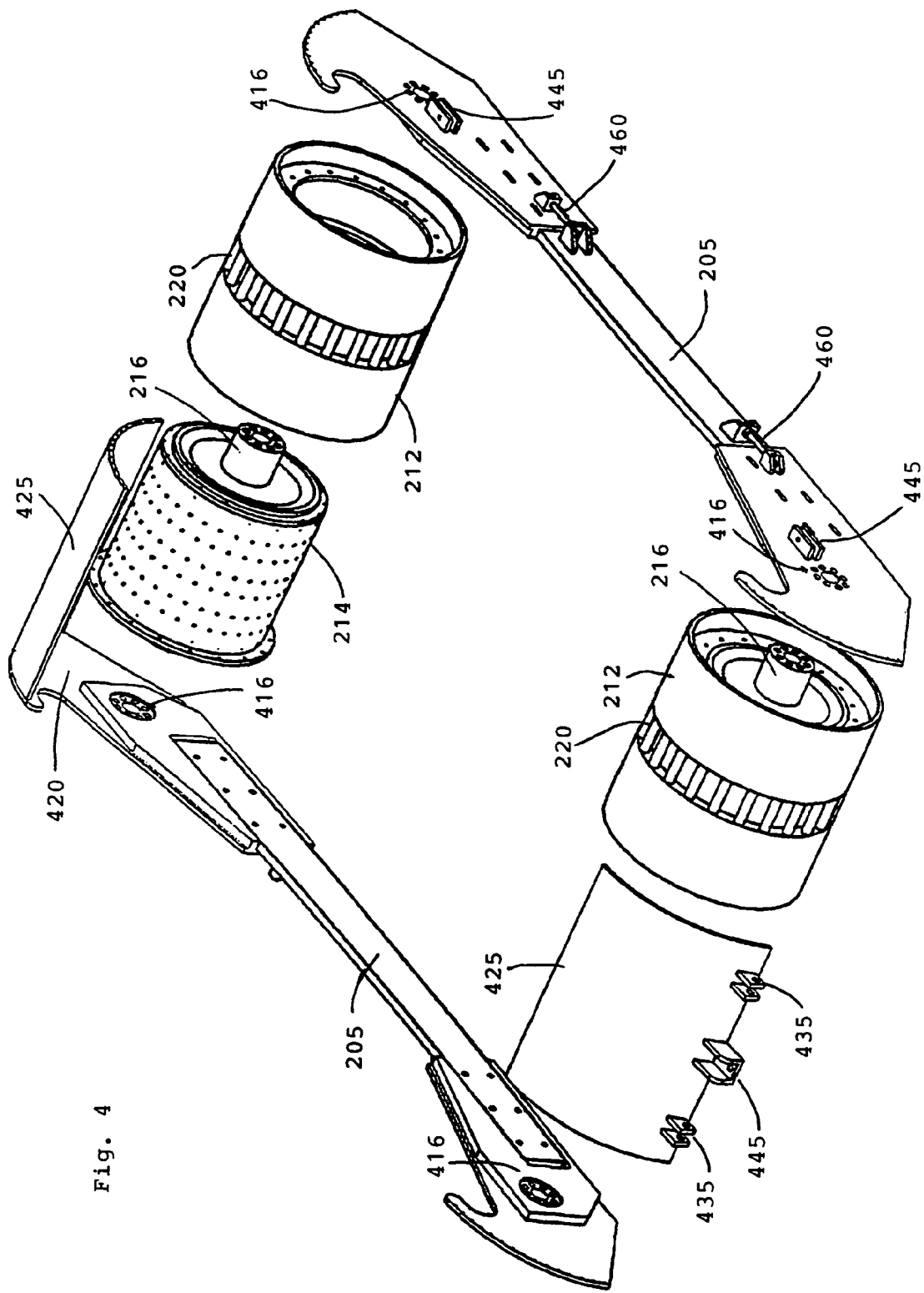
FIG. 4 is an exploded view of the track module frame wheels shown in FIG. 2.

FIG. 4 is an exploded perspective view of electrically driven wheels 210 and track module frame 200 according to an embodiment of the invention. As shown, the electrically driven wheels 210 includes a brushless DC motor 214 having a motor stationary mounting shaft 216 extending through the motor 214 for connecting the electrically driven wheels 210 with the track module frame 200. The track module frame 200 includes mounting plate 416 with mounting holes for connecting the motor stationary mounting shaft 216 of the electrically driven wheels 210 to the track module frame 200 of the vehicle 100 which is connected to the vehicle chassis 300 via the suspension system. The ground clearance is greatly increased and can be made to be adjustable and can be changed at will, and can be individually varied to compensate for terrain slope.

As shown in FIG. 4, the direct drive, sealed, PM brushless DC Motor 214 is contained within driving track wheel 212. Parallel track module frames 205 bolt to both ends of the motor stationary mounting shaft 216 of the brushless DC motor 214. While this embodiment has been described and illustrated using electrically driven track wheels, alternative independently driven track wheels may be substituted such as those described in U.S. Pat. No. 5,533,587 issued to Dow et al.; and U.S. Pat. Nos. 6,044,921 and 6,220,377 both issued to Lansberry, which are incorporated herein by reference hereto.

Figure 5:
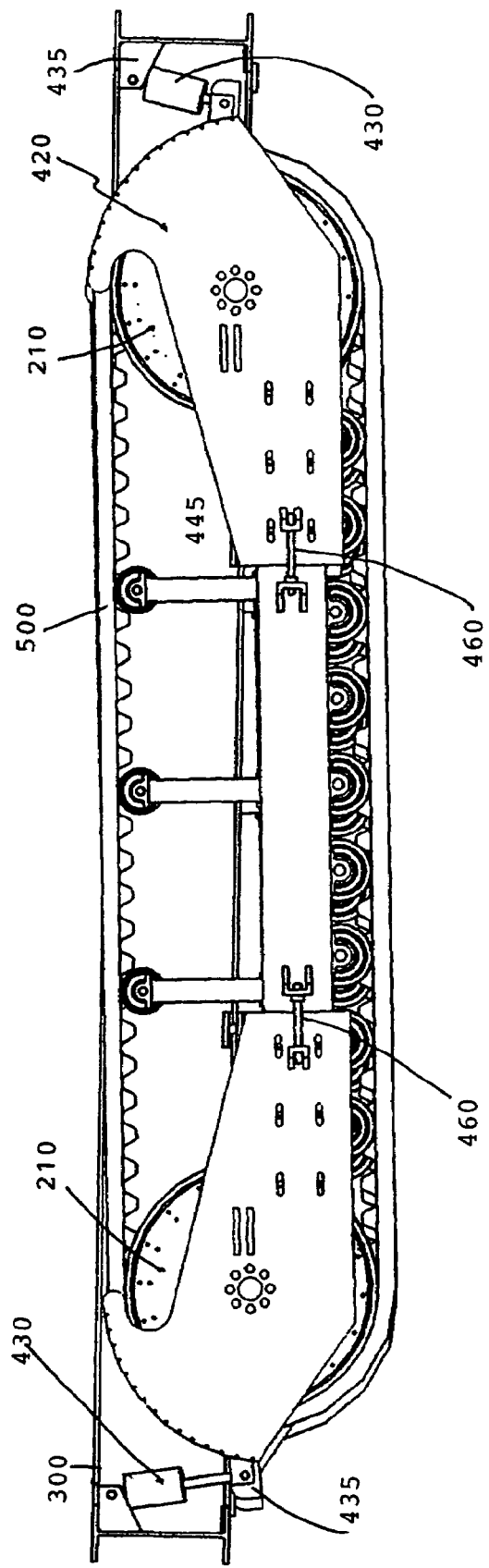
FIG. 5 is a side view of the track, driving track wheels and parallel track module frame connected with the tracked vehicle chassis.

FIG. 5 shows a side view of a front and rear electrically driven wheel 210 and parallel track frame 200 connected with the vehicle chassis frame 300. The track wheels 210 include built in cogs 220 at mate with matching cogs 520 on the inner surface of the track 500. The track 500 is located between the top cover 425 of the track module frame 200 and the driving track wheel 212 of corresponding front and rear independently driven track wheels 210 which drive the track 500.

The independently driven track wheels 212 connected to the track module frame 200 are suspended using the suspension system of the present invention to allow each driving track wheel 212 to have independent vertical movement, tilting (angular) movement, and torsional movement. This results in the track belt 500 having less stress which allows the track belt 500 to "give" or "follow" when encountering a high spot on the terrain instead of crushing the high spot with high concentration of vehicle weight on the high terrain spot.

By enclosing two track driving wheels 212 or one track driving wheel and one idler wheel on a track frame module 300, the torque of the driving wheel is distributed within the track frame module 300 in a self contained driving unit. The actual track 500 can be made of low temperature flexibility rubber tracks, or of special steel tracks, or of other materials as are well known in the art for use in non-uniform and/or environmentally sensitive terrain. The actual track 500 can be selected to have the ability to resiliently track uneven surfaces rather than flattening out the high spots, thus increasing track life and minimizing the disturbance to the terrain. This is especially important when traveling across environmentally sensitive terrain such as the tundra.

In the preferred embodiment, the track driving wheels 212 are independently powered to deliver power to the ground and to evenly distribute the actual tensile stress on the track belt. As shown in FIG. 4, each track driving wheel 212 includes 360 degrees of built in clogs 220 for driving the track 500. Using this configuration, each track driving wheel 212 has over 180 degrees of contact between the built in cogs 220 and mating belt cogs 520 on the inner surface of the track 500 as shown in FIG. 5.

Figure 6:
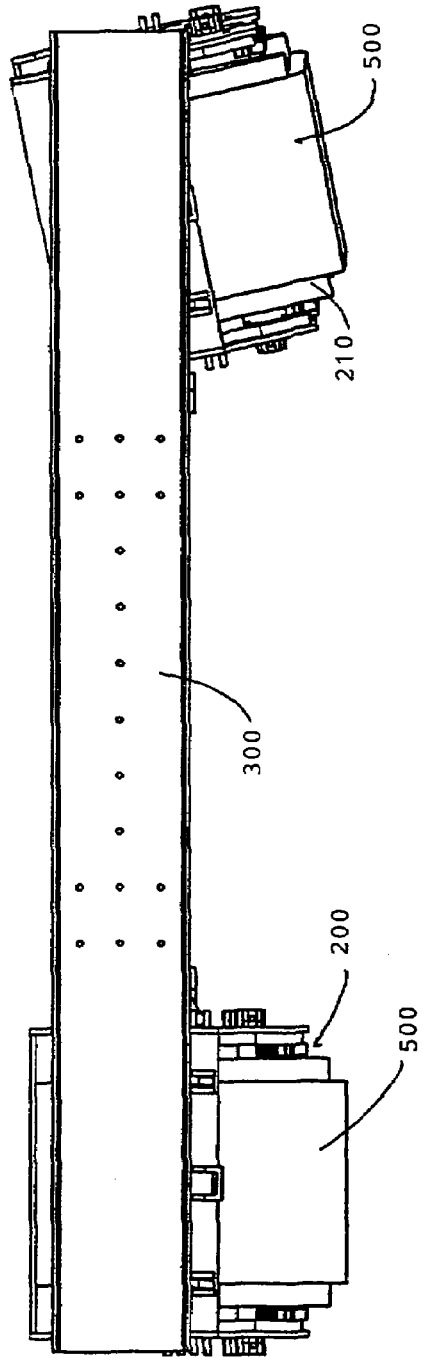
FIG. 6 is a rear view of the rear independently driven track wheels on uneven terrain.
Figure 7:
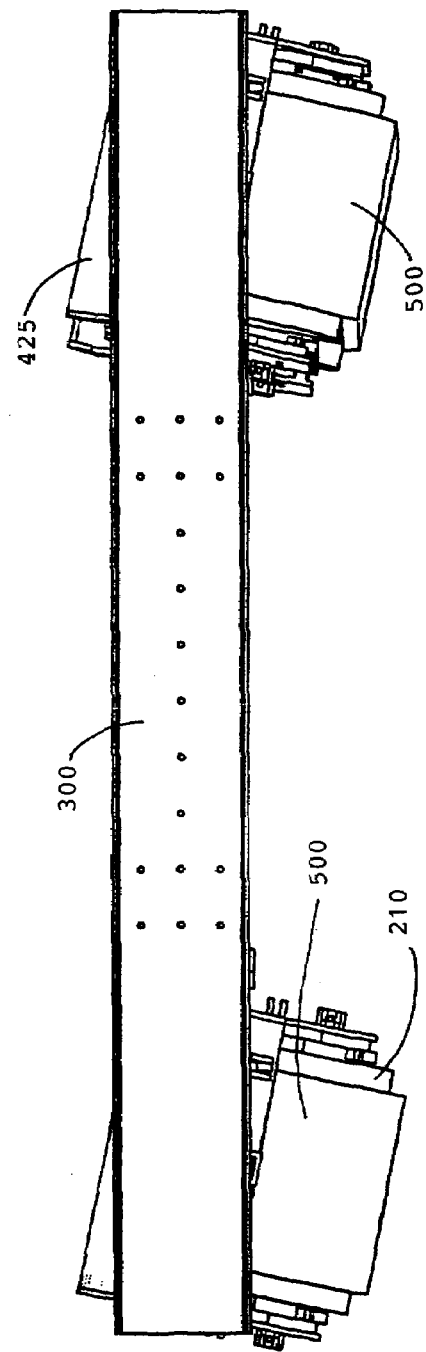
FIG. 7 is a rear view of the rear independently driven track wheels on a sloped surface.

FIG. 6 is a rear view of the left and right independently driven track wheels 210 on uneven terrain. As shown, the suspension system for each track module frame 200 allows each independently driven track wheel 210 to independently adjust to uneven terrain. As shown in FIG. 6, the track assemblies that are fully articulated with independent leveling, tilting, castor, camber, and toe-in. The track module frame includes suspension attachment plates having front and rear attachment points for suspending the track module frame to the tracked vehicle chassis to allow torsional flexing to accommodate terrain unevenness with significantly less terrain damage to provide a smoother, safer ride, with bump absorption, improved stability, and a faster allowable speed of navigation of uneven surfaces. As shown in FIG. 7, the flexible tracks and independently driven track wheels form track assemblies that are skewed for operation on slope.

Two or more track frame modules 200 are used to power a complete vehicle. Additional track frame modules 200 can be used to power trailers or additional vehicles connected in tandem with the vehicle, making up a trailer train. By suspending the two or more track module frames 200 from the chassis 300 of the main vehicle 100, shocks encountered by the track frame modules 200 are not transmitted to the vehicle chassis frame 300. Additionally, the vehicle has a smoother, safer ride, with bump absorption, improved stability, and a faster allowable speed of navigation of uneven surfaces. The independently driven wheels 210 are connected to the vehicle chassis 300 using an advanced suspension system according to the present invention as shown in FIGS. 2 and 3 that varies the amount of pressure in the individual suspension components, increase the ride height and ground clearance and provides a vehicle wherein tilt compensation can be adjusted and corrected.

By making the track frame modules as a self contained module, the vehicle has several advantages over the prior art. For example, the track frame modules can be made as interchangeable units, thus reducing parts count and lowering manufacturing cost and they can be shipped separately from the main vehicle chassis, reducing the total width to commonly acceptable allowable common carrier shipping widths. In the United States this is often twelve feet (12') without undue restriction. Upon reaching the destination, the vehicle can be easily reassembled to its total width, which may be twenty feet (20') or more. Alternatively, the track frame module can be changed as a complete spare assembly if required, which is advantageous in extremely cold or otherwise hostile environments. Another advantage provided by the track frame module with parallel frame sides is the balancing of loads with in the module itself and driving motor torque is reacted to a very long track frame module.

As shown in FIG. 5, the track belt 500 can be guided by the sides of the curved suspension plates 420 to reduce or eliminate the possibility of the belt becoming derailed from the driving track wheels 212. The belt tension can be regulated and adjusted by moving one of the independently driven track wheels 212 closer or further away from the other track wheel 212. This can be accomplished with hydraulic cylinders, pneumatic cylinders, air bags, powered jackscrews or manual jackscrews, in conjunction with sliding members 460 coupled with the track module frame parallel sides 210. Additionally, the parallel frame sides 210 can be made to possess torsional compliance to allow each track wheel 210 to tilt at a different angle according to the localized terrain irregularities encountered.

Although the description describes the novel invention for use in oil exploration on environmentally sensitive land such as frozen tundra, the invention can have other applications. For example, the invention can have application in military applications such in different environments such as sand and desert conditions. The invention can have application in agricultural uses such as for tractors, and farm equipment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A suspension system for a tracked vehicle comprising:
   at least two track module frames having two or four, or more, independently driven track wheel connected thereto for driving at least two flexible track assemblies, each of the at least two track module frames including:
      at least two sliding members for expanding and contracting a length of parallel sides of each of the at least two track module frames for adjusting a position of corresponding ones of the at least two or four independently driven track wheels closer and further away from another one of the independently driven track wheels or idlers; and
   at least four suspension cylinders for suspending a front and a rear of each of the at least two track module frames to a chassis of the tracked vehicle to allow torsional flexing to accommodate terrain unevenness with significantly less terrain damage and provide a smoother, safer ride, with bump absorption and improved stability.

2. The suspension system of claim 1, wherein each of the at least four suspension cylinders are one of a hydraulic cylinder, pneumatic cylinder, or air bags.

3. The suspension system of claim 1 further comprises:
at least two longitudinal links for attaching each of the at least two track module frames to the chassis to keep the at least two track module frames centered within the chassis of the tracked vehicle.

4. The suspension system of claim 1, wherein each of the at least two track module frames include:
at least two sliding members for expanding and contracting a length of parallel sides of each of the at least two track module frames for adjusting a position of corresponding ones of the at least two or four independently driven track wheels closer and further away from another one of the independently driven track wheels or idlers.

5. A tracked vehicle comprising:
a left and a right track module frame;
at least two or four independently driven track wheels, two connected to each of the left and the right track module frame;
at least two flexible tracks each coupled with two of the at least four independently driven track wheels, wherein at least four independently driven track wheels drive the at least two flexible tracks and the flexible tracks are fully articulated with independent leveling tilting, castor, camber, and toe-in;
a suspension system for connecting the left and the right track module frames with a chassis of a tracked vehicle cabin; and
a controller for controlling the at least four independently driven track wheels in response to a driver command, wherein by suspending the right and left track module frame from the tracked vehicle chassis, shocks encountered by the right and left track frame module are not transmitted to the tracked vehicle chassis.

6. The tracked vehicle of claim 5, wherein the at least two flexible tracks comprise:
track assemblies skewed for operation on slope.

7. The tracked vehicle of claim 5, wherein each of the left and right track module frames comprise:
suspension attachment plates having front and rear attachment points for connecting the track module frame to the suspension system to allow torsional flexing to accommodate terrain unevenness with significantly less terrain damage and provide a smoother, safer ride, with bump absorption, improved stability, and a faster allowable speed of navigation of uneven surfaces.

8. The tracked vehicle of claim 5, wherein the suspension system comprises:
suspension cylinders for connecting a front and a rear of the left and right track module frame to the tracked vehicle chassis.

9. The tracked vehicle of claim 8, further comprising:
front and rear lateral links for attaching a front and rear of each side of the left and right track module frame to the cbassis of the tracked vehicle to allow the left and right track module frame to independently move vertically, to tilt and to angle for resiliently tracking uneven surfaces rather than flattening out the high spots, this increasing track life and minimizing the disturbance to the terrain.

10. The tracked vehicle of claim 9, further comprising:
a longitudinal link for attaching an interior side of each of the left and right track module frame to the tracked vehicle chassis to keep the left and right track module frame centered within the tracked vehicle chassis.

11. The tracked vehicle of claim 5, wherein the suspension system comprises:
individual suspension devices, wherein varying amount of pressure in the individual suspension devices results in adjusting and correcting ride height, ground clearance, and tilt compensation.

12. The tracked vehicle of claim 11, wherein the individual suspension devices are selected from a group consisting of hydraulic cylinders, air cylinders and air bags.

13. The tracked vehicle of claim 5, wherein each of the left and right track module frames comprise:
parallel frame sides to balance loads within the track module frame, wherein a driving torque of the corresponding at least four independently driven track wheels is reacted to the track module frame.

14. The tracked vehicle of claim 13, wherein the parallel frame sides comprise:
sliding members for expanding and contracting a length of each of the left and right track module frames for adjusting a position of each one of the at least four independently driven track wheels closer or further away from another one of the at least four independently driven track wheels.

15. The tracked vehicle of claim 5, wherein the at least two flexible tracks comprise:
a material having a torsional compliance to allows each one of the at least four independently driven track wheels to tilt at a different angle according to the localized terrain irregularities encountered.

16. The tracked vehicle of claim 5, wherein suspension system comprises:
four suspension units for each of the left and right track module frame, the suspension units selected from one of hydraulic, pneumatic, and spring.

17. The tracked vehicle of claim 5, further comprising:
a shock absorber between the track module frame and the vehicle chassis to dampen oscillations.

18. The tracked vehicle of claim 5, further comprising:
load sharing Bogey wheels individually suspended from parallel frame sides of the left and right track module frames.

19. A suspension system for a tracked vehicle comprising:
at least two track module frames having two or four, or more, independently driven track wheel connected thereto for driving at least two flexible track assemblies;
at least four suspension cylinders for suspending a front and a rear of each of the at least two track module frames to a chassis of the tracked vehicle to allow torsional flexing to accommodate terrain unevenness with significantly less terrain damage and provide a smoother, safer ride, with bump absorption and improved stability; and
at least two longitudinal links for attaching each of the at least two track module frames to the chassis to keep the at least two track module frames centered within the chassis of the tracked vehicle.

20. A suspension system for a tracked vehicle comprising:
at least two track module frames having two or four, or more, independently driven track wheel connected Thereto for diving at least two flexible track assemblies each of the at least two track module frames including:
at least two sliding members for expanding and contracting a length of parallel sides of each of the at least two track module frames for adjusting a position of corresponding ones of the at least two or four independently driven track wheels closer and further away from another one of the independently driven track wheels or idlers; and at least four suspension cylinders for suspending a front and a rear of each of the at least two track module frames to a chassis of the tracked vehicle to allow torsional flexing to accommodate terrain unevenness with significantly less terrain damage and provide a smoother, safer ride, with bump absorption and improved stability.

21. A tracked vehicle comprising:
a left and a right track module frame;
at least two or four independently driven track wheels, two connected to each of the left and the right track module frame;
at least two flexible tracks each coupled with two of the at least four independently driven track wheels and the flexible tracks are skewed for operation on slope, wherein at least four independently driven track wheels drive the at least two flexible tracks;
a suspension system for connecting the left and the right track module frames with a chassis of a tracked vehicle cabin; and
a controller for controlling the at least four independently driven track wheels in response to a driver command, wherein by suspending the right and left track module frame from the tracked vehicle chassis, shocks encountered by the right and left track frame module are not transmitted to the tracked vehicle chassis.

22. A tracked vehicle comprising:
a left and a right track module frame, each of the left and right track module frames comprising:
suspension attachment plates having front and rear attachment points for connecting the track module frame to the suspension system to allow torsional flexing to accommodate terrain unevenness with significantly less terrain damage and provide a smoother, safer ride, with bump absorption, improved stability, and a faster allowable speed of navigation of uneven surfaces;
at least two or four independently driven track wheels, two connected to each of the left and the right track module frame;
at least two flexible tracks each coupled with two of the at least four independently driven track wheels, wherein at least four independently driven track wheels drive the at least two flexible tracks;
a suspension system for connecting the left and the right track module frames with a chassis of a tracked vehicle cabin; and
a controller for controlling the at least four independently driven track wheels in response to a driver command, wherein by suspending the right and left track module frame from the tracked vehicle chassis, shocks encountered by the right and left track frame module are not transmitted to the tracked vehicle chassis.

23. A tracked vehicle comprising:
a left and a right track module frame;
at least two or four independently driven track wheels, two connected to each of the left and the right track module frame;
at least two flexible tracks each coupled with two of the at least four independently driven track wheels, wherein at least four independently driven track wheels drive the at least two flexible tracks;
a suspension system for connecting the left and the right track module frames with a chassis of a tracked vehicle cabin, the suspension system comprising suspension cylinders for connecting a front and a rear of the left and right track module frame to the tracked vehicle chassis;
a controller for controlling the at least four independently driven track wheels in response to a driver command, wherein by suspending the right and left track module frame from the tracked vehicle chassis, shocks encountered by the right and left track frame module are not transmitted to the tracked vehicle chassis; and
front and rear lateral links for attaching a front and rear of each side of the left and right track module frame to the chassis of the tracked vehicle to allow the left and right track module frame to independently move vertically, to tilt and to angle for resiliently tracking uneven surfaces rather than flattening out the high spots, this increasing track life and minimizing the disturbance to the terrain.

24. A tracked vehicle comprising:
a left and a right track module frame, each of the left and right track module frames comprising parallel frame sides to balance loads within the track module frame, wherein a driving torque of the corresponding at least four independently driven track wheels is reacted to the track module frame;
at least two or four independently driven track wheels, two connected to each of the left and the right track module frame;
at least two flexible tracks each coupled with two of the at least four independently driven track wheels, wherein at least four independently driven track wheels drive the at least two flexible tracks;
a suspension system for connecting the left and the right track module frames with a chassis of a tracked vehicle cabin; and
a controller for controlling the at least four independently driven track wheels in response to a driver command, wherein by suspending the right and left track module frame from the tracked vehicle chassis, shocks encountered by the right and left track frame module are not transmitted to the tracked vehicle chassis.

* * * * *